United States Patent [19]

Haigh et al.

[11] Patent Number: 4,529,656

[45] Date of Patent: Jul. 16, 1985

[54] OIL IMBIBING POLYMER PARTICLES WHICH ARE BLOCK RESISTANT

[75] Inventors: Daniel H. Haigh, Sanford; Edwin G. Larson, Midland, both of Mich.

[73] Assignee: The Dow Chemical Company, Midland, Mich.

[21] Appl. No.: 487,474

[22] Filed: Apr. 22, 1983

[51] Int. Cl.³ .............................. C08F 220/10
[52] U.S. Cl. .................... 428/402; 526/281; 526/282
[58] Field of Search ............... 526/281, 282; 428/402

[56] References Cited

U.S. PATENT DOCUMENTS

| | | | |
|---|---|---|---|
| 3,485,775 | 12/1969 | Cenci et al. | 526/282 |
| 3,536,788 | 10/1970 | Hurwitz et al. | 526/282 |
| 3,681,298 | 8/1972 | Hurwitz et al. | 526/282 |
| 3,784,532 | 1/1974 | Fellmann et al. | 526/282 |
| 4,269,959 | 5/1981 | Lawton | 428/402 |

Primary Examiner—Harry Wong, Jr.
Attorney, Agent, or Firm—R. B. Ingraham

[57] ABSTRACT

Nonblocking oil-swellable oil-insoluble synthetic resinous particle are prepared using isobornyl methacrylate as major monomer.

9 Claims, No Drawings

OIL IMBIBING POLYMER PARTICLES WHICH ARE BLOCK RESISTANT

Oil imbibing polymer particles are well known in the art and have been employed for a variety of applications. Such applications include the separation of oils such as lubricating oil, fuel oil, and gasoline from water to provide environmentally acceptable water streams. Such particles have also been employed with benefit in so-called imbiber valves wherein a plurality of oil imbibing beads are positioned within a housing having an inlet and an outlet, the beads being disposed between the inlet and outlet, such valves permit the flow of material such as water therethrough. However, if the water is contaminated with an organic oily substance, that is a relatively non-polar organic material, the material is imbibed by the particles, the particles swell and prevent the flow of water therethrough, thus preventing contamination of the environment. A variety of compositions are employed to prepare such imbibing particles whether they be in relatively large bead form, for example, in the range of 1 to 5 millimeters, or in the form of latex particles. Such latex particles generally have a particle size of from about 500 angstroms to about 2500 angstroms. Various imbiber beads or oil imbibing particles are set forth in the following U.S. Pat. Nos. 3,520,806; 3,686,827; 3,750,688; 3,881,295; 3,958,590; 3,999,653; 4,024,882; 4,019,628; 4,130,400; and 4,172,031, the teachings of which are incorporated by reference thereto. Such imbiber particles are oil swellable but oil insoluble. Typical of such oil imbibing polymers is a polymer of tertiary butyl styrene, lightly crosslinked with an appropriate crosslinking agent such as divinylbenzene. The quantity of the divinylbenzene copolymerized in the t-butyl styrene divinylbenzene copolymer is controlled to permit a desired degree of swelling, when the particle is exposed to an oil or oil-like material. Such oils or oil-like materials include materials ranging from gasoline, diesel fuel, lubricating oil, benzene, toluene, various chlorinated solvents, such as chloroform, carbontetrachloride and the like. It is critical for such oil imbibing particles to be crosslinked to an extent sufficient to render the particles insoluble in the oil being employed, and yet be swellable by imbibing the oil. Many of such imbiber beads are capable of imbibing many times their original volume of oil. Insofar as the oil imbibing function of such particles is concerned, their capacity is dependent primarily upon the amount of crosslinking present in the polymer particles. A particle having a diameter of 1 micron and a particle having a diameter of 5 millimeters assuming a like degree of crosslinking, will result in the same proportional amount of oil absorption. However, as smaller particles of oil imbibing polymers provide more surface per unit of weight, equilibrium in any oil containing system is obtained much more rapidly with the smaller particles than with the larger particles. The large particles of polymer have a substantial advantage in that they are readily handled, readily retained and provide a readily accessible void space between the particles through which a liquid may flow. Small diameter particles offer the significant and substantial advantage that more rapid equilibrium is obtained and significantly less time is required for the removal of a given quantity of oily substance per unit weight of polymer in a given time. Oil imbibing polymer particles of smaller diameters exhibit a substantial and significant disadvantage in that they are more susceptible to the phenomenon of blocking than are larger particles. By the term blocking is meant the propensity of particles to adhere to one another. The tendency of such polymers to block increases markedly as the particle size of the particles is reduced. Thus, particles having a diameter of about 5 millimeters exhibit a much lower blocking tendency than do particles having diameters in the range of about 1 micron or less. For many applications, it is desirable that such oil imbibing polymer particles be shipped and stored in a relatively dry condition. Generally, such polymers are prepared by a suspension polymerization process and the polymer particles recovered by filtering and drying. Once dried, oftentimes such particles are placed into containers which may range from small containers containing a few ounces to drums or hoppers containing many kilograms. Oftentimes in shipping and storage such containers are exposed to ambient temperatures sufficient to cause adherence of the particles to each other, or blocking. Once blocking has occurred, separation of the particles of relatively large particle size, for example, 3 to 5 millimeters, is usually readily accomplished by mild agitation or tumbling. However, as the particle size decreases, and the blocking tendency becomes greater, the particles become increasing difficult to separate from each other. The phenomenon of blocking is particularly undesirable in small diameter in oil imbibing particles from the standpoint of handling and the fact that the available surface particles for contact with oily materials to be imbibed is generally reduced significantly.

It would be desirable if there were available improved oil-swellable oil-insoluble particles with the capability of imbibing oily materials and which had a reduced tendency to block.

It would also be desirable if there were available such an improved oil imbibing particle which could be prepared from readily available monomeric materials.

These benefits and other advantages in accordance with the present invention are achieved in a plurality of oil-insoluble oil-swellable particles of synthetic resinous composition, the particles being crosslinked copolymers of from about 100 percent to about 55 percent by weight of isobornyl methacrylate and another monomer copolymerizable therewith, and advantageously having a glass transition temperature of 27° C. and advantageously in excess of 30° C.

The term "organic liquid-insoluble, organic liquid-swellable polymer" as used herein refers to those polymers having the property of being substantially insoluble in, but capable of being swollen by, that is, imbibing, one or more nonaqueous organic liquids such as for example, gasolines, kerosenes, light oils, heavy oils, aromatic solvents such as benzene, toluene and xylene, terpenes and ketones, esters, phenols, aldehydes, amides, amines, mercaptans, fatty acids, fatty acid esters, halohydrocarbons, polar organic compounds, monoglycerides, triglycerides, diglycerides and the like. In other words, these polymers are swellable by any organic liquid which is a solvent for the polymer's linear analogue. A wide variety of comonomers may be employed with isobornyl methacrylate in the preparation of particles in accordance with the present invention. Such comonomers include alkyl styrenes having alkyl groups containing from 4 to 20 carbon atoms and beneficially from about 4 to 12 carbon atoms. Such alkylstyrenes include tertiary alkylstyrene including p-tert-butylstyrene, p-tert-amylstyrene, p-tert-hexylstyrene, p-tert-octylstyrene, p-tert-dodecylstyrene, p-tert-octadecylstyrene, and p-tert-eicosylstyrene; n-alkylstyrenes including for example n-butylstyrene, n-dodecylstyrene, n-octadecylstyrene, and n-eicosylstyrene; sec-alkylstyrenes including for example sec-butylstyrene, sec-hexylstyrene, sec-octylstyrene, sec-dodecylstyrene, sec-octadecylstyrene, and seceicosylstyrene; isoalkylstyrenes including for example isobutylstyrene, isoamylstyrene, isohexylstyrene, isooctylstyrene, isododecylstyrene, isooctadecylstyrene, and isoeicosylstyrene; and copolymers thereof.

Especially desirable comonomers for the preparation of particles in accordance with the present invention include copolymers of isobornyl methacrylate with alkyl esters derived from $C_1$ to $C_{24}$ alcohols and acrylic or methacrylic acids or mixtures thereof. Such comonomers include hexyl acrylate, hexyl methacrylate, octyl acrylate, octyl methacrylate, decyl acrylate, decyl methacrylate, dodecyl methacrylate, dodecyl acrylate, lauryl acrylate, eicosyl acrylate, eicosylmethacrylate, or mixitures thereof. In terms of the principle monomers employed for the preparation of particles in accordance with the present invention, a polymer may be from 100 to 55 weight percent isobornyl methacrylate to from about 0 to 45 weight percent of a comonomer polymerizable therewith. Beneficially, for maximum rate of imbibition, such a comonomer often preferably has a relatively high aliphatic content such as octylstyrene, lauryl methacrylate and the like. It is critical to the present invention that the polymers used as imbibing agents contain a small amount of a crosslinking agent. Normally such crosslinking agents are employed in the range of from about 0.5 to about 2 percent by weight based on the combined weight of the principle or monomer or monomers. Generally, the level of crosslinking agent is less than about 1 percent which permits the polymers to swell easily and imbibe a substantial volume of organic liquid. The amount of crosslinking agent employed will vary somewhat for optimum results with the particular crosslinking agent utilized. For most applications, it is desirable that the quantity of crosslinking agent utilized be sufficient to permit a swelling of the polymer particles when exposed to the organic oily liquid and to be sufficient to prevent the particles from being dissolved by the oily liquid.

Cross-linking agents which can be used in preparing the imbibing polymers suitable for use in the present invention include polyethylenically unsaturated compounds such as divinylbenzene, diethyleneglycol dimethacrylate, diisopropenylbenzene, diisopropenyldiphenyl, diallyl maleate, diallyl phthalate, allyl acrylates, allyl methacrylates, allyl fumarates, allyl itaconates, alkyl resin types, butadiene or isoprene polymers, cyclooctadiene, methylene norbornylenes, divinyl phthalates, vinylisopropenylbenzene, divinylbiphenyl, as well as any other di-or poly-functional compound known to be of use as a cross-linking agent in polymeric vinyl-addition compositions. Normally, the polymer containing the crosslinking agent swells with the imbibed organic liquid. If there is too much crosslinking agent, the imbibition takes an unreasonably long time or the polymer is unable to imbibe a sufficient quantity of the organic liquid, thus reducing the effectiveness of the polymer as an imbiber. If the imbibitional polymer contains no crosslinking agent or too little crosslinking agent, then it will dissolve in the organic liquid resulting, for example, in a nondiscrete, nonparticulate mass of polymer-thickened organic liquid on the surface of the water.

Both the amount of swelling of the imbibing polymer particles and the amount of polymer to be used to imbibe organic liquids in the practice of this invention depend upon the amount and type of organic liquid to be imbibed, as well as the particular polymer employed and the extent to which the polymer is crosslinked. Normally, less than one, and usually less than 0.1 part by weight of imbibing polymer per part of organic liquid is used in the practice of the invention.

The process of this invention is operable at any temperature wherein the organic liquid and contaminated fluid remain in the liquid state.

The imbibing polymers used in the practice of this invention can be obtained by polymerization in solution, suspension, emulsion, mass, or a coil reactor. These polymers are particulate in nature, remaining discrete, swelled polymer particles after imbibing the organic liquids. Beneficially such particles have average diameters of from about 500Å to 5 mm.

Polymer particles in accordance with the present invention offer a substantial and significant advantage over many of the oil imbibing particles hereinbefore known. In general, the density of the polymer particles of the present invention is greater than 1, therefore the particles tend to sink when mixed with water. The tendency of the particles to sink provides a substantial and significant advantage over many of the heretofore known oil imbibing particles. For example, in the event that a body of water is contaminated with an oily organic material, for instance carbontetrachloride, liquid carbontetrachloride will tend to exist as a separate phase at the bottom of the body of water. Therefore, addition of particles in accordance with the present invention, to the body of water will result in the particles sinking to the bottom, contacting the carbontetrachloride and imbibing the carbontetrachloride, permitting separation of the carbontetrachloride from the body of water. For many applications substantial advantage is obtained if the particles in accordance with the present invention are prepared by a suspension polymerization which results in a generally spherical particle which is free flowing in nature and facilitates handling, filtering and the like.

The present invention is further illustrated but not limited by the following example:

A 16 ounce citrate of magnesia bottle was charged with 140 grams of deionized water containing 0.2 weight percent, based on the weight of the water, carboxymethyl methycellulose and 0.1 weight percent, based on the weight of the water, potassium dichromate. Carboxymethyl methylcellulose is employed as a dispersing agent while the potassium dichromate serves the function of a water phase initiation polymerization inhibitor. Monomers employed in the polymerization were passed through a bed of activated alumina to remove inhibitors and the like. Polymers employed were: 42 grams of isobornyl methyacrylate; 28 grams of lauryl methacrylate; 0.931 gram of a commercial divinylbenzene which contained 56.4 percent divinylbenzene, the remainder being primarily ethylvinylbenzene. The monomeric components were mixed and after mixing was complete, 0.14 gram of t-butylperoctoate as a free radical initiator was dissolved in the monomer solution. The resulting monomer mixture was added to the water phase in the citrate of magnesia bottle. The bottle was subsequently purged with nitrogen, capped and shaken vigorously to suspend the monomer phase within the water phase, the monomer phase being a plurality of small droplets. The citrate of magnesia bottle and contents were placed in a tumbling water bath wherein the bottle was tumbled at a rate of 20 revolutions per minute. The temperature of the water bath was increased from ambient temperature to a temperature of about 75 degrees centigrade, and maintained at that temperature with tumbling for a period of about 20 hours. At the end of the 20 hour period, the bottle was removed from the water bath and bottle and contents cooled to ambient temperature, the bottle opened, the reaction mixture filtered and the resultant polymer beads washed with deionized water and subsequently with methanol. The particles so obtained were dried in air at about ambient temperature. The resultant dried polymer beads were relatively hard, free flowing, and had an average diameter of about 500 microns. The glass transition temperature of the resultant polymer was about 32 degrees centigrade.

For purposes of comparison, a similar polymer was prepared wherein tertiary-butylstyrene was substituted for the isobornylmethacrylate. Polymer obtained was softer and exhibited a definite tendency to block and sinter together. The glass transition temperature of the tertiary-butylstyrene copolymer was about 21 degrees centigrade.

By way of further illustration, a test tube having a length of about 6 inches and a diameter of about 1/2 inch was charged with 2 grams of trichloroethane and 20 grams of deionized water. Separate phases formed wherein the trichloroethane was the lower of the phases, and the water was the upper. 1 gram of the hereinbefore prepared isobornylmethacrylate polymer was added to the tube at the top of the water layer. The resultant polymer particles sank slowly to the bottom of the tube, contacted and imbibed the trichloroethane. The foregoing imbibition experiment was repeated employing the tertiary-butylstyrene laurylmethacrylate copolymer. The polymer floated atop the water and no rapid imbibition of the trichloroethane occurred.

In a manner similar to the foregoing illustrations, a wide variety of isobornylmethacrylate polymers and copolymers are readily prepared which exhibit desirable imbibition properties for a wide variety of organic materials.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A plurality of oil-insoluble oil-swellable particles of synthetic resinous compositions, the particles being crosslinked copolymers of from about 100 percent to about 55 percent by weight of isobornyl methacrylate and another monomer copolymerizable therewith selected from the group consisting of alkyl styrenes having alkyl groups containing 4 to 20 carbon atoms, alkylesters derived from $C_1$ to $C_{24}$ alcohols and acrylic or methacrylic acids or mixtures thereof and a polyethylenically unsaturated compound as crosslinking agent.

2. The particles of claim 1 wherein the monomer copolymerizable therewith is tertiary-butylstyrene.

3. The particles of claim 1 wherein the monomer copolymerizable therewith is lauryl methacrylate.

4. The particles of claim 1 having a glass transition temperature greater than 27 degrees centigrade.

5. The particles of claim 1 having a glass transition temperature greater than 30 degrees centigrade.

6. The particles of claim 1 having a density greater than 1.

7. The particles of claim 1 having copolymerized therein from about 0.5 to 2 weight percent of crosslinking agent.

8. The particles of claim 7 wherein the crosslinking agent is present in an amount less than 1 weight percent of the particles.

9. The particles of claim 1 having an average diameter of from about 500 angstroms to about 5 millimeters.

* * * * *